US012630397B2

(12) United States Patent
Manz et al.

(10) Patent No.: US 12,630,397 B2
(45) Date of Patent: May 19, 2026

(54) DEVICE FOR HOLDING OBJECTS

(71) Applicant: SEW-EURODRIVE GMBH & CO. KG, Bruchsal (DE)

(72) Inventors: Friedrich Manz, Kraichtal-Münzesheim (DE); Jan-Patrick Ködderitzsch, Durmersheim (DE); Joshua Gordon David Frisch, Hambrücken (DE); Bastian Freitag, Brühl (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 368 days.

(21) Appl. No.: 18/556,125

(22) PCT Filed: Mar. 31, 2022

(86) PCT No.: PCT/EP2022/058427
§ 371 (c)(1),
(2) Date: Oct. 19, 2023

(87) PCT Pub. No.: WO2022/223253
PCT Pub. Date: Oct. 27, 2022

(65) Prior Publication Data

US 2024/0228242 A1 Jul. 11, 2024

(30) Foreign Application Priority Data

Apr. 19, 2021 (DE) ......................... 102021002020.0

(51) Int. Cl.
*B66C 23/48* (2006.01)

(52) U.S. Cl.
CPC .................................... *B66C 23/48* (2013.01)

(58) Field of Classification Search
None
See application file for complete search history.

(56) References Cited

U.S. PATENT DOCUMENTS 4,213,727 A 7/1980 Lighthipe
4,251,056 A * 2/1981 Maniglia .................. B66F 5/04
254/8 B
4,266,903 A 5/1981 Surbrook
(Continued)

FOREIGN PATENT DOCUMENTS

DE 8715318 U1 1/1988

OTHER PUBLICATIONS

International Report on Patentability issued in corresponding International Application No. PCT/EP2022/058427 dated Oct. 24, 2023, pp. 1-7, English Translation.
(Continued)

*Primary Examiner* — Michael S Lowe
(74) *Attorney, Agent, or Firm* — Carter, DeLuca & Farrell LLP

(57) ABSTRACT

A device for holding objects, e.g., driverless transport vehicles, includes a rack main frame and a pivot arm which can be pivoted relative to the rack main frame about a pivot axis extending in a longitudinal direction. The pivot arm has a first strut and a second strut which extend at a right angle to the pivot axis and are disposed parallel to each other at an offset in the longitudinal direction. One cutout is provided in the end region of each of the struts remote from the pivot axis for receiving respective fastening shafts.

15 Claims, 6 Drawing Sheets

(56) References Cited

U.S. PATENT DOCUMENTS

| | | | | |
|---|---|---|---|---|
| 5,709,523 A * | 1/1998 | Ware | B66F 9/065 | 414/664 |
| 5,951,192 A * | 9/1999 | Collins | E02F 3/3636 | 403/150 |
| 7,824,144 B2 * | 11/2010 | Wilson | B62B 5/0003 | 280/47.15 |
| 7,931,431 B2 * | 4/2011 | Benedict | B63B 25/22 | 414/137.1 |

OTHER PUBLICATIONS

International Search Report issued in corresponding International Application No. PCT/EP2022/058427 dated Jul. 26, 2022, pp. 1-2, English Translation.

* cited by examiner

DEVICE FOR HOLDING OBJECTS

FIELD OF THE INVENTION

The present invention relates to a device for holding objects, e.g., driverless transport vehicles.

BACKGROUND INFORMATION

A driverless transport vehicle is described in German Patent Document No. 10 2013 019 726. Driverless transport vehicles are used in technical plants, for example, in production plants, to transport objects, for example, small parts or boxes. For example, these mobile transport vehicles bring components from logistics areas, such as a materials warehouse, to workplaces where the components are processed.

For the assembly, maintenance or repair of a driverless transport vehicle, it is possible to lift the driverless transport vehicle to a position that is convenient for a mechanic. For example, workshop cranes are utilized for lifting objects. To carry out work on the underside of a driverless transport vehicle, it is possible to rotate the lifted driverless transport vehicle accordingly.

SUMMARY

Example embodiments of the present invention provide a device for holding objects, e.g., driverless transport vehicles.

According to example embodiments of the present invention, a device for holding objects, e.g., for holding driverless transport vehicles, includes a rack main frame and a pivot arm which can be pivoted relative to the rack main frame about a pivot axis extending in a longitudinal direction. The pivot arm has a first strut and a second strut which extend at a right angle to the pivot axis and are disposed parallel to each other at an offset in the longitudinal direction. One cutout each is provided in the end regions of the struts remote from the pivot axis for receiving respective fastening shafts.

The device can be used to lift subjects, e.g., driverless transport vehicles, into a convenient position for modifications and repairs. Lifted driverless transport vehicles can also be rotated about their center of gravity axis by a suitable attachment to the device, creating optimal ergonomic working conditions for a mechanic. The device can also be manufactured relatively inexpensively.

According to example embodiments, the device for holding objects further includes two receiving devices which can be connected to an object to be held. The receiving devices each have a fastening shaft which can be received by respectively one of the cutouts. The receiving devices are arranged to be compatible with the objects to be held. Thus, almost any object, but, e.g., driverless transport vehicles, can be picked up by the device.

According to example embodiments, the receiving devices are disposed such that the fastening shafts extend coaxially to a common fastening axis. An object held by the device can thus be rotated about the fastening axis, e.g., by 360°. By rotating the object accordingly, access is thus possible from any side.

According to example embodiments, a drive unit is attached to one of the struts, which is connected to one of the fastening shafts such that the fastening shaft can be rotated about the fastening axis by the drive unit. An object held by the device can be rotated about the fastening axis by the drive unit, e.g., by 360°.

According to example embodiments, the drive unit has a gearbox coupled to one of the fastening shafts and a handwheel coupled to the gearbox. Thus, rotation of the held object is possible manually by turning the handwheel. The gearbox reduces the torque required for turning. No external power supply is required.

For example, the gearbox is arranged to be self-locking. Unintentional movement of the held object is thus avoided. Thus, no additional brakes or similar blocking devices are required.

It is possible that the drive unit has a gearbox coupled to one of the fastening shafts, and that the gearbox has a drive shaft for coupling with a battery-driven screwdriver. This makes it possible to electrically drive the held object without the need for an external power supply.

According to example embodiments, a respective locking bolt is provided at the end regions of the struts remote from the pivot axis for fixing a respective fastening shaft in a respective cutout. By the locking bolt, the object held by the device is secured against slipping as well as against falling down.

According to example embodiments, the device for holding objects further includes a drive mechanism for pivoting the pivot arm relative to the rack main frame about the pivot axis. The drive mechanism has a hydraulic cylinder hinged to the rack main frame and to the pivot arm, and a hydraulic pump hydraulically connected to the hydraulic cylinder. The drive mechanism allows the held object to be lifted by pivoting the pivot arm, in which only a relatively small amount of force is required. No external power supply is required.

For example, the drive mechanism also has a pipe rupture protection. In addition to the mechanical protection, the pipe rupture protection serves as hydraulic protection against falling of a lifted object. For example, the drive mechanism also has a throttle valve. The throttle valve controls the hydraulic flow and thus regulates the speed during lowering of a clamped object.

It is also possible that the drive mechanism has an electric cylinder hinged to the rack main frame and to the pivot arm. An external power supply or an electrical energy storage unit for driving the electric cylinder is also provided in this case. Furthermore, it is possible that the drive mechanism has a gearbox, for example, with a spindle, which is hinged to the rack main frame and to the pivot arm, and a handwheel for driving the gearbox.

According to example embodiments, a locking unit is hinged to the rack main frame and to the pivot arm, and the locking unit in a locked state prevents pivoting of the pivot arm about the pivot axis relative to the rack main frame in at least one pivot direction, and in an unlocked state allows pivoting of the pivot arm about the pivot axis relative to the rack main frame in both pivot directions. The locking unit provides a fall protection for the held object, which remains effective even in case of failure of the hydraulic drive mechanism. Again, no external power supply is required.

According to example embodiments, the locking unit has an outer pipe, an inner pipe coaxially guided in the outer pipe, and a rotary bolt attached to the outer pipe. The inner pipe has a plurality of locking openings. In the locked state of the locking unit, the rotary bolt engages in one of the locking openings of the inner pipe, and in the unlocked state of the locking unit, the rotary bolt is outside the locking openings. The locking unit is thus constructed in a relatively simple and functionally safe manner.

According to example embodiments, the device has a Bowden cable by which the rotary bolt can be pivoted into a locking opening of the inner pipe and out of a locking opening of the inner pipe. For example, the Bowden cable is disposed such that control is possible from a position close to the hydraulic pump of the drive mechanism. Thus, only one person is required to pivot the pivot arm as well as to lock and unlock the pivot arm.

According to example embodiments, the device for holding objects has a plurality of rollers which are disposed on the rack main frame and respectively can be rotated about an axis of rotation extending in a horizontal direction. In addition, the rollers can each be pivoted relative to the rack main frame about an axis extending in a vertical direction. The device can thus be moved manually on a floor. In the event of an accident of a driverless transport vehicle, recovery and transport to a repair area is thus also possible.

According to example embodiments, the device for holding objects has a plurality of locking brakes for locking the rollers. Thus, while working on the held object, the device can be fixed on the floor on which the device is located.

According to example embodiments, a receiving unit is disposed on the rack main frame, to which receiving unit energy can be transmitted inductively from a charging unit. The charging unit is arranged, for example, as a line-shaped conductor or a coil and is stationary in a floor on which the device is located. The energy inductively transmitted from the charging unit to the receiving unit is used, for example, to charge an electrical energy storage unit or to operate the drive unit as well as the drive mechanism. Thus, an electric drive is possible without the need for an external power supply with cables and plug connections.

Further features and aspects of example embodiments of the present invention are explained in more detail below with reference to the appended schematic Figures.

DETAILED DESCRIPTION

Figure 1:
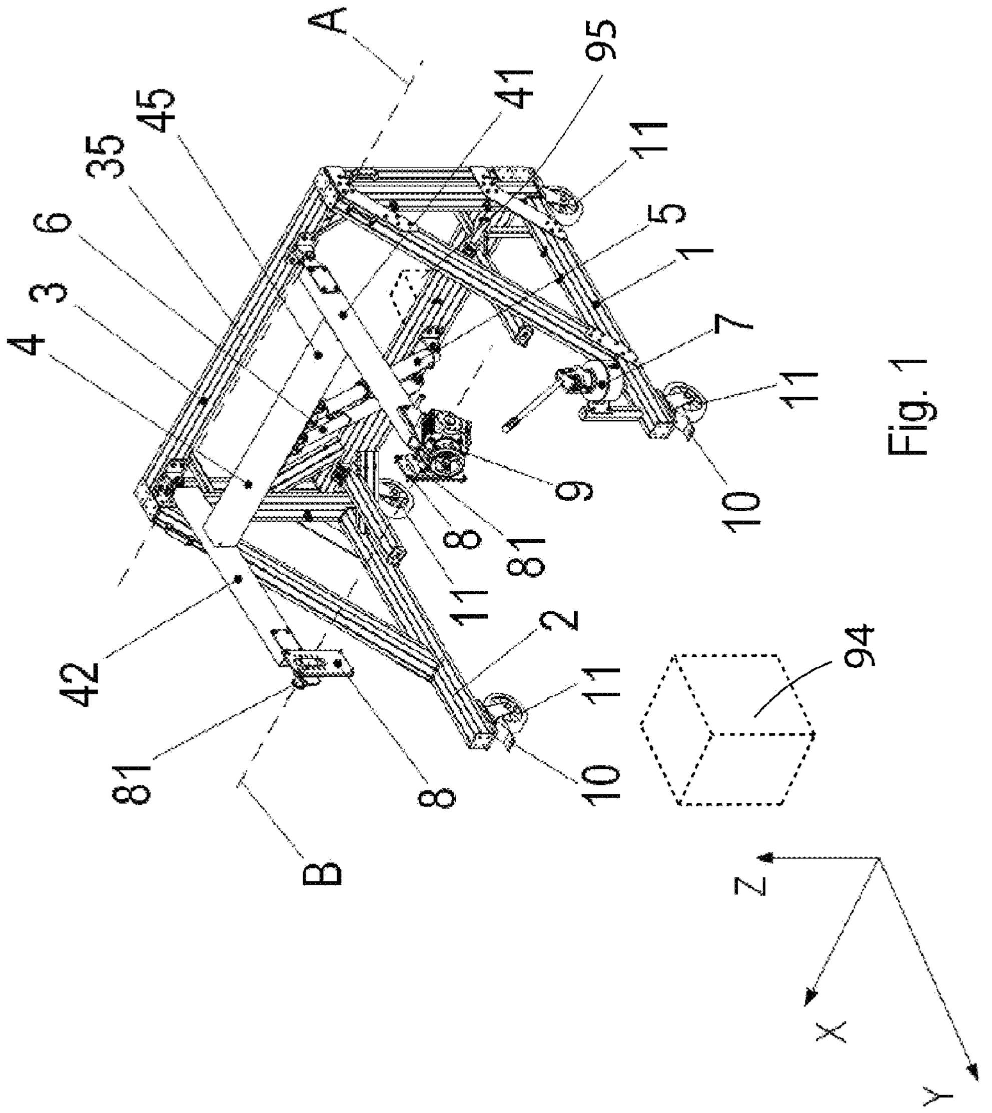
FIG. 1 is a perspective view representation of a device for holding objects.

FIG. 1 is a perspective view of a device for holding objects 94, e.g., driverless transport vehicles 94. The device is located on a floor in a technical plant, for example, in a production plant. The device is used, e.g., for maintenance or repair of driverless transport vehicles 94 used in the technical plant.

The device includes a rack main frame 3, which includes metal profiles. The rack main frame 3 has, for example, a crossbar 35 extending in a longitudinal direction X. The rack main frame 3 further has a first rack support arm 1 and a second rack support arm 2. The rack support arms 1, 2 each extend in a cross direction Y and are disposed parallel to each other at an offset in the longitudinal direction X.

The cross direction Y extends runs at a right angle to the longitudinal direction X. A vertical direction Z extends runs at a right angle to the cross direction Y and at a right angle to the longitudinal direction X. The longitudinal direction X and the cross direction Y represent horizontal directions. The crossbar 35 is disposed at a distance from the rack support arms 1, 2 in the vertical direction Z. As illustrated, the crossbeam 35 is further away from the ground than the rack support arms 1, 2.

The device has a plurality of rollers 11. The rollers 11 are disposed on the rack main frame 3, e.g., on the rack support arms 1, 2. The rollers 11 can each be rotated about an axis of rotation extending in a horizontal direction. The device has a plurality of locking brakes 10 for locking the rollers 11. A locking brake 10 is assigned to each of the rollers 11.

The device includes a pivot arm 4. The pivot arm 4 can be pivoted about a pivot axis A extending in the longitudinal direction X relative to the rack main frame 3, e.g., relative to the crossbar 35. The pivot arm 4 has a first strut 41 and a second strut 42. The struts 41, 42 extend at a right angle to the pivot axis A and are disposed parallel to each other at an offset in the longitudinal direction X. The pivot arm 4 further has a cross strut 45 extending in the longitudinal direction X and connecting the struts 41, 42.

By pivoting the pivot arm 4 about the pivot axis A relative to the rack main frame 3 in a first pivot direction, end regions of the struts 41, 42 remote from the pivot axis A are moved upwardly in the vertical direction Z, i.e., away from the floor. By pivoting the pivot arm 4 about the pivot axis A relative to the rack main frame 3 in an opposite second pivot direction, the end regions of the struts 41, 42 are moved downwardly in the vertical direction Z, i.e., towards the floor.

The device further includes a drive mechanism for pivoting the pivot arm 4 about the pivot axis A relative to the rack main frame 3. The drive mechanism has a hydraulic cylinder 5 that is hinged to the rack main frame 3 and to the pivot arm 4. The drive mechanism also has a hydraulic pump 7 which is hydraulically connected to the hydraulic cylinder 5. For example, the hydraulic pump 7 can be operated manually. By increasing the hydraulic pressure, the hydraulic cylinder 5 extends and swivels the pivot arm 4 in the first swivel direction. By reducing the hydraulic pressure, the hydraulic cylinder 5 contracts and swivels the pivot arm 4 in the second swivel direction.

The device further includes a locking unit 6. The locking unit 6 is hinged to the rack main frame 3 and to the pivot arm 4. In a locked state, the locking unit 6 prevents pivoting of the pivot arm 4 about the pivot axis A relative to the rack main frame 3 in at least the second pivot direction. In an unlocked state, the locking unit 6 allows pivoting of the pivot arm 4 about the pivot axis A relative to the rack main frame 3 in both pivot directions.

The device also includes two receiving devices 8, which can be connected, for example, by screws, to an object to be held. The receiving devices 8 each have a fastening shaft 81. The receiving devices 8 are attached to a respective end region of the struts 41, 42 remote from the pivot axis A. The receiving devices 8 are disposed such that the two fastening shafts 81 extend coaxially to a common fastening axis B.

The device further includes a drive unit 9. The drive unit 9 is attached to the first strut 41, e.g., on the end region of the first strut 41 remote from the pivot axis A. The drive unit 9 is connected to one of the fastening shafts 81 of a receiving device 8. By the drive unit 9, the fastening shaft 81 can be rotated about the fastening axis B relative to the first strut 41.

Figure 2:
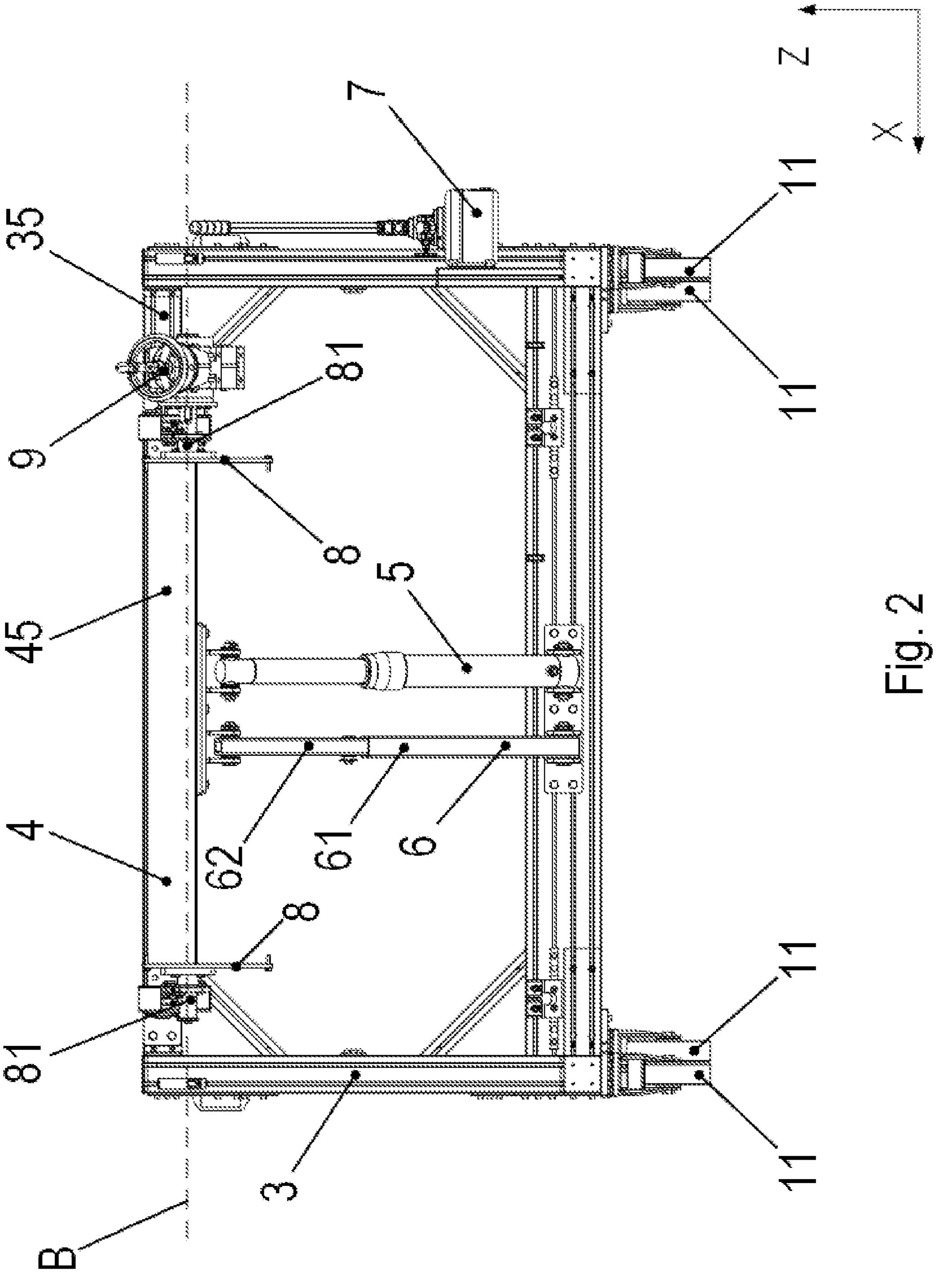
FIG. 2 is a front view of the device.

FIG. 2 is a front view of the device for holding objects illustrated in FIG. 1. The locking unit 6 has an outer pipe 61 and an inner pipe 62. The inner pipe 62 is guided coaxially in the outer pipe 61. The locking unit 6 and the hydraulic cylinder 5 are both hinged to the cross strut 45 of the pivot arm 4. The locking unit 6 and the hydraulic cylinder 5 extend parallel to each other.

Figure 3:
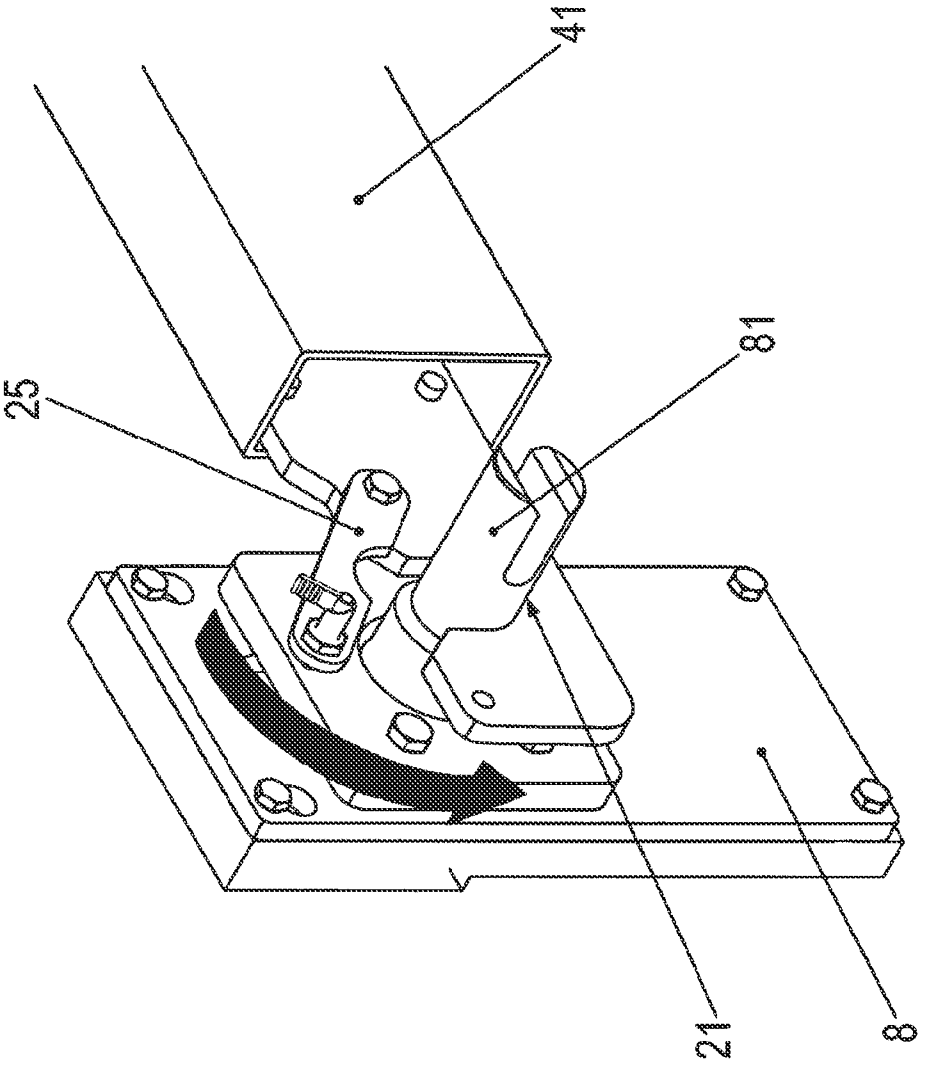
FIG. 3 is an enlarged view of an end region of a strut.

FIG. 3 is an enlarged view of the end region of the first strut 41 remote from the pivot axis A. A cutout 21 for receiving a fastening shaft 81 is provided in the end region of the first strut 41. In the cutout 21, the fastening shaft 81 of a receiving device 8 is received.

At the end region of the first strut 41, a locking bolt 25 is provided which serves to fix the fastening shaft 81 in the cutout 21. By pivoting the locking bolt 25 in the direction indicated by the arrow, the fastening shaft 81 is fixed in the cutout 21. By pivoting the locking bolt 25 in the opposite direction, the fixing of the fastening shaft 81 in the cutout 21 is undone.

The end region of the second strut 42 remote from the pivot axis A is arranged mirror-symmetrical to the end region of the first strut 41. A cutout 21 is also provided at the end region of the second strut 42, in which cutout a fastening shaft 81 is received. A locking bolt 25 for fixing the fastening shaft 81 is also provided at the end region of the second strut 42.

Figure 4:
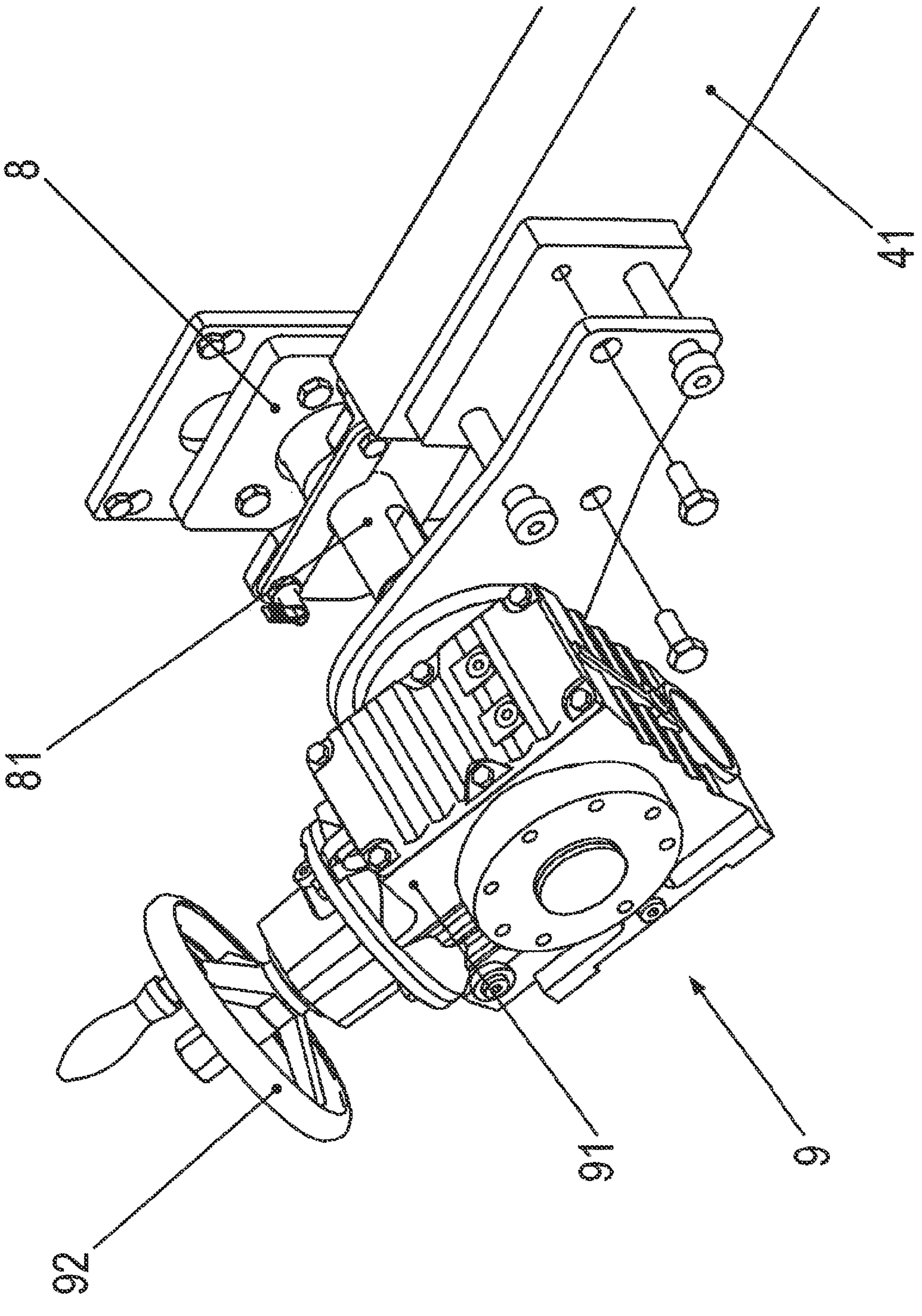
FIG. 4 is an enlarged view of a drive unit.

FIG. 4 is shows an enlarged view of a drive unit 9. The drive unit 9 is attached to the end region of the first strut 41 remote from the pivot axis A. The drive unit 9 has a gearbox 91 and a handwheel 92. The gearbox 91 is coupled, e.g., connected in a rotationally fixed manner, to the fastening shaft 81. The handwheel 92 is coupled, e.g., connected in a rotationally fixed manner, to the gearbox 91. Turning the handwheel 92 causes the fastening shaft 81 to rotate about the fastening axis B relative to the first strut 41.

Figure 5:
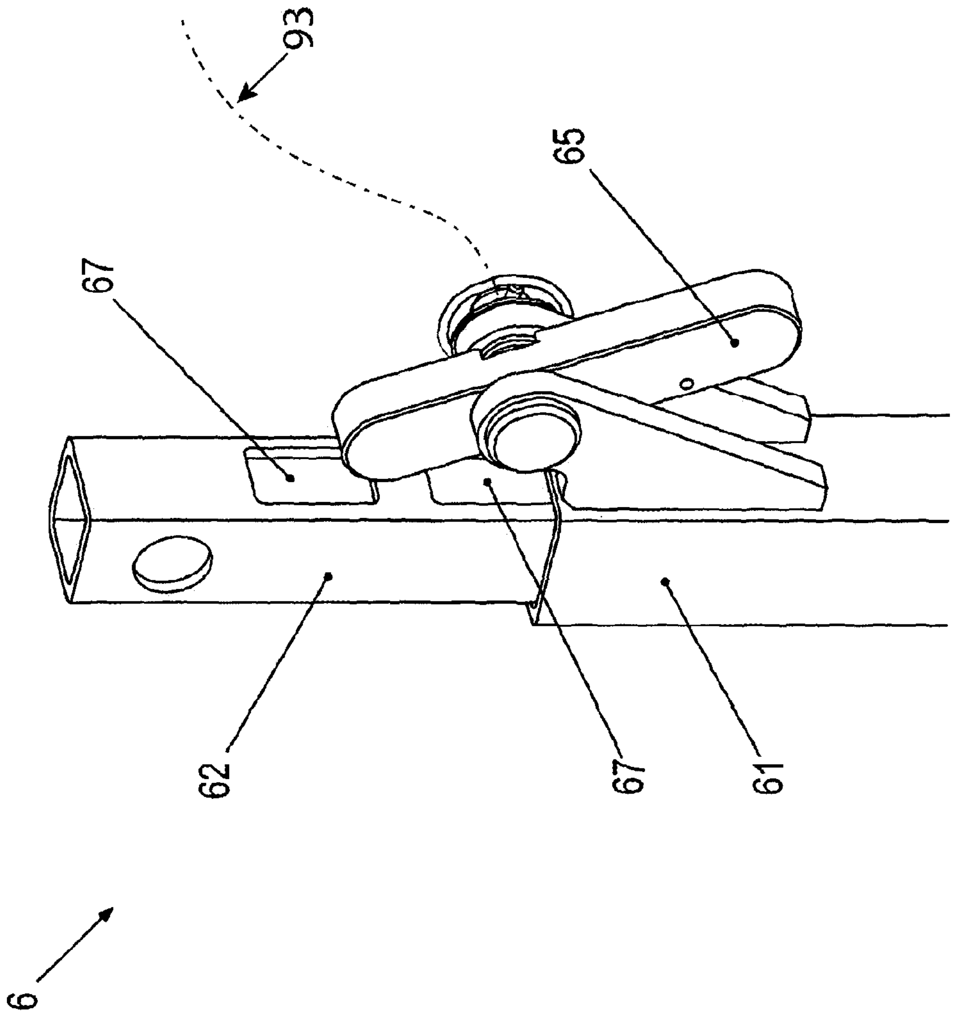
FIG. 5 illustrates a locking unit in an unlocked state.

FIG. 5 illustrates a locking unit 6 in an unlocked state. As mentioned above, the locking unit 6 has an outer pipe 61 and an inner pipe 62 coaxially guided in the outer pipe 61. The locking unit 6 also has a rotary bolt 65, which is attached to the outer pipe 61. The inner pipe 62 has a plurality of locking openings 67. In the unlocked state of the locking unit 6, the rotary bolt 65 is located outside the locking openings 67.

Figure 6:
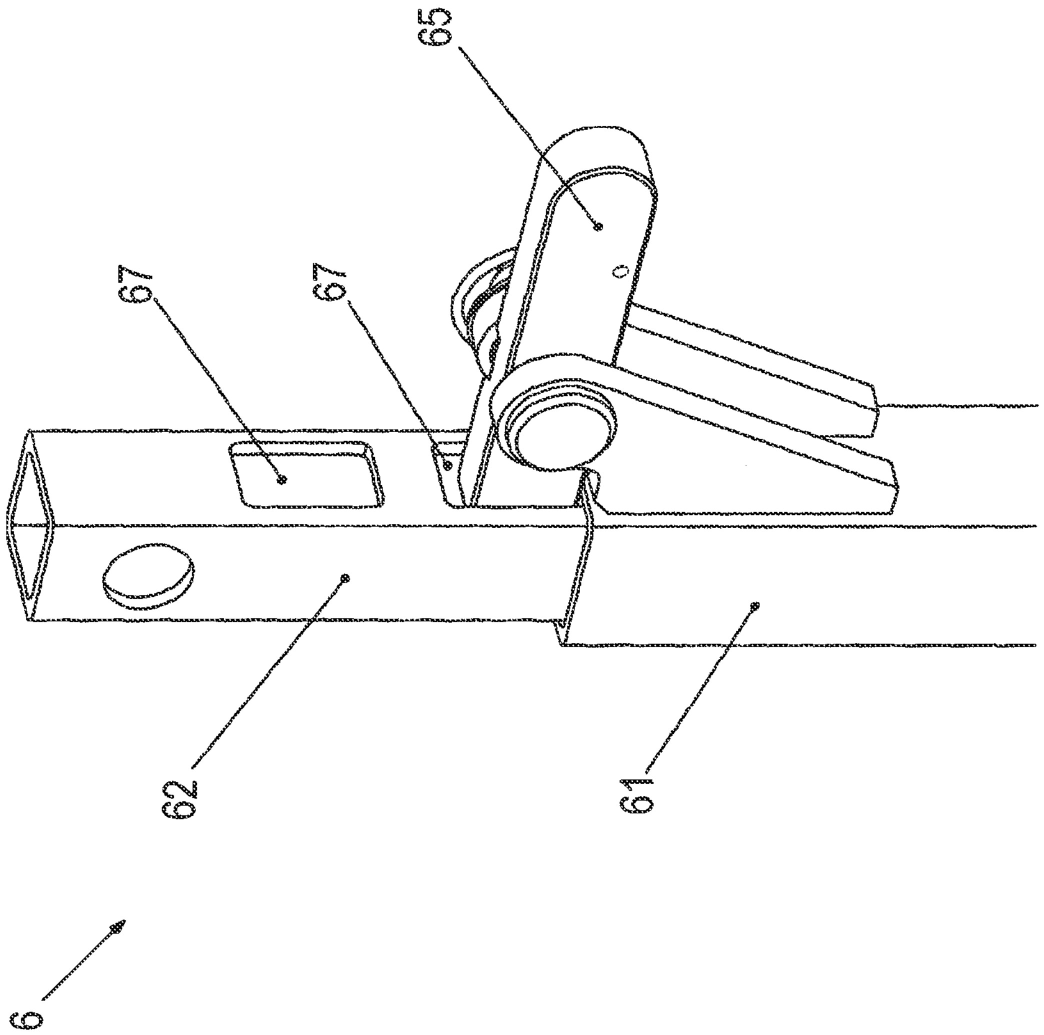
FIG. 6 illustrates a locking unit in a locked state.

FIG. 6 illustrates a locking unit 6 in a locked state. In the locked state of the locking unit 6, the rotary bolt 65 engages in one of the locking openings 67 of the inner pipe 62.

As mentioned above, the device has a Bowden cable 93 by which the rotary bolt 65 can be pivoted into the locking opening 67 of the inner pipe 62 and out of the locking opening 67 of the inner pipe 62. As also mentioned above, a receiving unit 95 is disposed on the rack main frame 3, to which receiving unit 95 energy can be transmitted inductively from a charging unit.

LIST OF REFERENCE CHARACTERS

1 First rack support arm
2 Second rack support arm
3 Rack main frame
4 Pivot arm
5 Hydraulic cylinder
6 Locking unit
7 Hydraulic pump
8 Receiving device
9 Drive unit
10 Locking brake
11 Roller
21 Cutout
25 Locking bolt
35 Crossbar
41 First strut
42 Second strut
45 Cross strut
61 Outer pipe
62 Inner pipe
65 Rotary bolt
67 Locking opening
81 Fastening shaft
91 Drive
92 Handwheel
93 Bowden cable
94 Object, e.g., driverless transport vehicle
95 Receiving unit
A Pivot axis
B Fastening axis
X Longitudinal direction
Y Cross direction
Z Vertical direction

The invention claimed is:

1. A device for holding an object, comprising
a rack main frame;
a pivot arm pivotable relative to the rack main frame about a pivot axis that extends in a longitudinal direction, the pivot arm including a first strut and a second strut that extend at a right angle to the pivot axis and that are disposed parallel to each other at an offset in the longitudinal direction, an end region of each strut remote from the pivot axis including a cutout adapted to receive a respective fastening shaft; and
a locking unit hingedly connected to the rack main frame and to the pivot arm, the locking unit, in a locked state, being adapted to prevent pivoting of the pivot arm about the pivot axis relative to the rack main frame in at least one of two pivot directions, and, in an unlocked state, adapted to allow pivoting of the pivot arm about the pivot axis relative to the rack main frame in the two pivot directions;
wherein the locking unit includes an outer pipe, an inner pipe coaxially guided in the outer pipe, and a rotary bolt attached to the outer pipe, the inner pipe including a plurality of locking openings, in the locked state of the locking unit, the rotary bolt being adapted to engage in one of the locking openings of the inner pipe, and, in the unlocked state of the locking unit, the rotary bolt adapted to be outside the locking openings.

2. The device according to claim 1, wherein the object includes a driverless transport vehicle.

3. The device according to claim 1, further comprising two receiving devices adapted to connect to the object, each receiving device including a fastening shaft adapted to be received by a respective one of the cutouts.

4. The device according to claim 3, wherein the fastening shafts are adapted to extend coaxially to a common fastening axis.

5. The device according to claim 4, wherein a drive unit is attached to one of the struts, the drive unit adapted to connect to one of the fastening shafts and to rotate the one of the fastening shafts about the fastening axis.

6. The device according to claim 5, wherein the drive unit includes a gearbox coupled to the one of the fastening shafts and a handwheel coupled to the gearbox.

7. The device according to claim 1, further comprising two receiving devices adapted to connect to the object, each receiving device including a fastening shaft, each cutout adapted to receive a respective one of the fastening shafts.

8. The device according to claim 1, wherein a locking bolt is arranged at the end region of each strut remote from the pivot axis adapted to fix a respective fastening shaft in a corresponding cutout.

9. The device according to claim 1, further comprising a drive mechanism adapted to pivot the pivot arm about the pivot axis relative to the rack main frame, the drive mechanism including (a) a hydraulic cylinder hingedly connected to the rack main frame and to the pivot arm and (b) a hydraulic pump hydraulically connected to the hydraulic cylinder.

10. The device according to claim 1, further comprising a Bowden cable adapted to pivot the rotary bolt into and out of at least one of the locking openings of the inner pipe.

11. The device according to claim 1, further comprising a Bowden cable adapted to pivot the rotary bolt into and out of a respective locking opening of the inner pipe.

12. The device according to claim 1, further comprising a plurality of rollers disposed on the rack main frame and rotatable about an axis of rotation extending in a horizontal direction.

13. The device according to claim 1, further comprising a plurality of rollers disposed on the main rack frame and rotatable about an axis of rotation extending in a direction parallel to the longitudinal direction.

14. The device according to claim 13, further comprising a plurality of locking brakes adapted to lock the rollers.

15. The device according to claim 1, further comprising a receiving unit arranged on the rack main frame adapted to receive energy transmitted inductively from a charging unit.

* * * * *